(12) United States Patent
Ryowa et al.

(10) Patent No.: US 8,123,979 B2
(45) Date of Patent: Feb. 28, 2012

(54) GROUP 13 NITRIDE PHOSPHOR AND METHOD OF PREPARING THE SAME

(75) Inventors: Tatsuya Ryowa, Nara (JP); Hajime Saito, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 815 days.

(21) Appl. No.: 12/120,613

(22) Filed: May 14, 2008

(65) Prior Publication Data

US 2008/0283801 A1    Nov. 20, 2008

(30) Foreign Application Priority Data

May 15, 2007  (JP) ................................ 2007-128971

(51) Int. Cl.
*C09K 11/06* (2006.01)
*C09K 11/02* (2006.01)
(52) U.S. Cl. ............................... 252/301.33; 252/301.35
(58) Field of Classification Search ............. 252/301.36, 252/301.16, 301.33, 301.35
See application file for complete search history.

(56) References Cited

U.S. PATENT DOCUMENTS

| | | | | |
|---|---|---|---|---|
| 6,630,307 | B2 * | 10/2003 | Bruchez et al. ................ | 435/6 |
| 2006/0158089 | A1 * | 7/2006 | Saito et al. ................... | 313/467 |
| 2006/0240227 | A1 | 10/2006 | Zhang et al. | |
| 2008/0173845 | A1 * | 7/2008 | Ryowa et al. ............ | 252/301.36 |

FOREIGN PATENT DOCUMENTS

| | | |
|---|---|---|
| JP | 2001-520937 A | 11/2001 |
| JP | 2002-038145 A | 2/2002 |
| JP | 2005-105244 A | 4/2005 |
| JP | 2006-328234 A | 12/2006 |
| JP | 2006-335873 A | 12/2006 |
| JP | 2007-077245 A | 3/2007 |
| JP | 2007-077246 A | 3/2007 |
| JP | 2007077245 A * | 3/2007 |
| WO | WO-99/21934 A1 | 5/1999 |
| WO | WO-2004/000971 A1 | 12/2003 |
| WO | WO 2006118543 A1 * | 11/2006 |

OTHER PUBLICATIONS

Murray et al., "Synthesis and Characterization of Nearly Monodisperse CdE (E=S, Se, Te) Semiconductor Nanocrystallites", Journal of American Chemical Society, 1993; vol. 115 No. 19; pp. 8706-8715.

Xie et al., "A Benzene-Thermal Synthetic Route to Nanocrystalline GaN", Science, vol. 272 No. 5270; Jun. 28, 1996; pp. 1926-1927.

(Continued)

*Primary Examiner* — Jerry Lorengo
*Assistant Examiner* — Lynne Edmondson
(74) *Attorney, Agent, or Firm* — Birch, Stewart, Kolasch & Birch, LLP

(57) ABSTRACT

Provided are a group 13 nitride phosphor having high luminous intensity and excellent reliability obtained by preparing group 13 nitride crystallites homogeneously dispersible in a solid matrix by capping surface defects and homogeneously dispersing the group 13 nitride crystallites in the solid matrix and an efficient method of preparing the same. The present invention relates to a group 13 nitride phosphor consisting of group 13 nitride crystallites having a group 13 element dispersed in a matrix of a silica gel solid layer, with a diamine compound bonded to the surfaces of the group 13 nitride crystallites and the silica gel solid layer, and a method of preparing the same.

7 Claims, 2 Drawing Sheets

OTHER PUBLICATIONS

Boev et al., "Synthesis and Characterization of a Sol-Gel Derived Ureasilicate Hybrid Organic-Inorganic Matrix Containing CdS Colloidal Particles", Journal of Sol-Gel Science and Technology, 2004, vol. 31, pp. 131-135, Kluwer Academic Publishers.

Zhang et al., "Synthesis and Characterization of Nanosized ZnS Confined in Ordered Mesoporous Silica", Chem. Mater., 2001, vol. 13, pp. 648-654, American Chemical Society.

Bian et al., "Synthesis and luminescence property of rare earth complex nanoparticles dispersed within pores of modified mesoporous silica", Materials Research Bulletin, 2002, vol. 37, pp. 2293-2301, Elsevier Science Ltd.

Korean Application No. 10-2008-44350; Notice of Allowance; Dec. 7, 2010; pp. 1-2.

* cited by examiner

GROUP 13 NITRIDE PHOSPHOR AND METHOD OF PREPARING THE SAME

This nonprovisional application is based on Japanese Patent Application No. 2007-128971 filed with the Japan Patent Office on May 15, 2007, the entire contents of which are hereby incorporated by reference.

BACKGROUND OF THE INVENTION

1. Field of the Invention

The present invention relates to a group 13 nitride phosphor and a method of preparing the same, and more particularly, it relates to a group 13 nitride phosphor improved in luminous intensity and a method of preparing the same. More specifically, the present invention relates to a group 13 nitride phosphor consisting of group 13 nitride crystallites homogeneously dispersed in a matrix of a silica gel solid layer and a method of preparing the same.

2. Description of the Background Art

It is known that crystallites of a semiconductor exhibit a quantum size effect when reduced to about the Bohr radius. The quantum size effect is such an effect that electrons in a substance reduced in size cannot freely move and the energy thereof can assume only an unarbitrary specific value. Further, the size of crystallites confining the electrons changes to change the energy state of the electrons, and the wavelength of light emitted from the crystallites is reduced in proportion to the size (refer to C. B. Murray, D. J. Norris and M. G. Bawendi, "Synthesis and Characterization of Nearly Monodisperse CdE (E=S, Se, Te) Semiconductor Nanocrystallites", Journal of the American Chemical Society, 1993, Vol. 115, pp. 8706-8715 (Non-Patent Document 1)). The crystallites exhibiting such a quantum size effect are noted as a material applicable to phosphor particulates, and subjected to various studies.

However, crystallites prepared from a group II-VI compound semiconductor described in Non-Patent Document 1 are inferior in reliability and durability, and contain an environmental pollutant such as cadmium or selenium. Therefore, a material substituting for such crystallites has been demanded.

An attempt has been made to synthesize crystallites of a nitride-based semiconductor as a material substituting for the group II-VI compound semiconductor (refer to Yi Xie, Yitai Qian, Wenzhong Wang, Shuyuan Zhang and Yuheng Zhang, "A Benzene-Thermal Synthetic Route to Nanocrystalline GaN", SCIENCE, June 1996, Vol. 272, No. 5270, pp. 1926-1927 (Non-Patent Document 2)). According to Non-Patent Document 2, GaN nanocrystallites are synthesized by reacting gallium trichloride and lithium nitride with each other in a benzene solution.

The aforementioned crystallites exhibiting the quantum size effect have large specific surface areas due to small particle diameters thereof, to disadvantageously flocculate. In order to employ the crystallites as phosphor particulates, therefore, it is important to suppress radiationless deactivation on the surfaces thereof by treating the surfaces, for improving luminous intensity. Therefore, a phosphor prepared by dispersing the crystallites in a solid matrix in order to supply excellent dispersibility and luminous intensity to the crystallites is studied (refer to Japanese Patent Laying-Open No. 2005-105244 (Patent Document 1)).

SUMMARY OF THE INVENTION

In consideration of the aforementioned circumstances, the inventors have made a deep study in order to implement group 13 nitride crystallites having excellent dispersibility in a solid matrix, exhibiting a low environmental load and having an emission wavelength in the visible region in simple liquid phase synthesis. Then, they have prepared group 13 nitride crystallites homogeneously dispersible in a solid matrix by capping surface defects.

Accordingly, an object of the present invention is to provide a group 13 nitride phosphor consisting of group 13 nitride crystallites homogeneously dispersed in a solid matrix and exhibiting high luminous intensity and excellent reliability and an efficient method of preparing the same.

The present invention relates to a group 13 nitride phosphor consisting of group 13 nitride crystallites having a group 13 element dispersed in a matrix of a silica gel solid layer, with a diamine compound bonded to the surfaces of the group 13 nitride crystallites and the matrix of the silica gel solid layer. The group 13 nitride phosphor according to the present invention so contains the diamine compound that the group 13 nitride crystallites are homogeneously dispersed in the matrix of the silica gel solid layer, whereby the group 13 nitride phosphor can excellently emit light upon irradiation with excitation light, and exhibits high reliability. Further, the group 13 nitride crystallites, easily causing surface defects due to large specific surface areas and high ratios of surface atoms having unsaturated bonds, can be passivated by surface modification with the diamine compound, to be improved in luminous efficiency.

In the group 13 nitride phosphor according to the present invention, modified organic molecules are preferably further bonded to the surfaces of the group 13 nitride crystallites. In this case, surface defects on the surfaces of the group 13 nitride crystallites, for example, can be repaired due to the bonding.

In the group 13 nitride phosphor according to the present invention, the material for the modified organic molecules is preferably amine.

In the group 13 nitride phosphor according to the present invention, the group 13 element is preferably indium (In) and/or gallium (Ga). In this case, group 13 nitride crystallites having wide gaps can be provided, and visible light of a desired color can be emitted by adjusting the ratio of mixed crystals of In and Ga in the group 13 nitride crystallites.

The present invention also relates to a method of preparing a group 13 nitride phosphor consisting of group 13 nitride crystallites having a group 13 element dispersed in a matrix of a silica gel solid layer, comprising the steps of preparing a mixed solution by mixing a diamine compound, a group 13 element-containing compound and a nitrogen element-containing compound with each other or by mixing a diamine compound and a group 13 element-nitrogen element-containing compound with each other, preparing group 13 nitride crystallites bonded with the diamine compound by heating the mixed solution, and dispersing the group 13 nitride crystallites in a matrix of a silica gel solid layer.

In the method according to the present invention, modified organic molecules are preferably further mixed into the mixed solution.

In the method according to the present invention, the material for the modified organic molecules is preferably amine. According to the inventive method of preparing a group 13 nitride phosphor, the group 13 nitride crystallites and the matrix of the silica gel solid layer can be strongly bonded to each other by bonding one of nitrogen elements in the diamine compound to the surfaces of the group 13 nitride crystallites and bonding the other nitrogen element to the matrix of the silica gel solid layer. The group 13 nitride crystallites, bonded with the diamine compound, homogeneously dispersible in the matrix of the silica gel solid layer can be prepared through simple liquid phase synthesis by properly selecting the modified organic molecules.

The group 13 nitride phosphor comprising the matrix of the silica gel solid layer and the group 13 nitride crystallites having wide gaps further contains the diamine compound, so that the group 13 nitride crystallites can be homogeneously dispersed in the matrix of the silica gel solid layer. Consequently, the group 13 nitride phosphor according to the present invention can implement high luminous intensity. Further, the modified organic molecules are bonded to the surfaces of the group 13 nitride crystallites, thereby repairing surface defects.

The present invention provides a group 13 nitride phosphor, containing group 13 nitride crystallites, excellent in luminous efficiency, dispersibility and medium affinity and a high-yield method of preparing the same.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
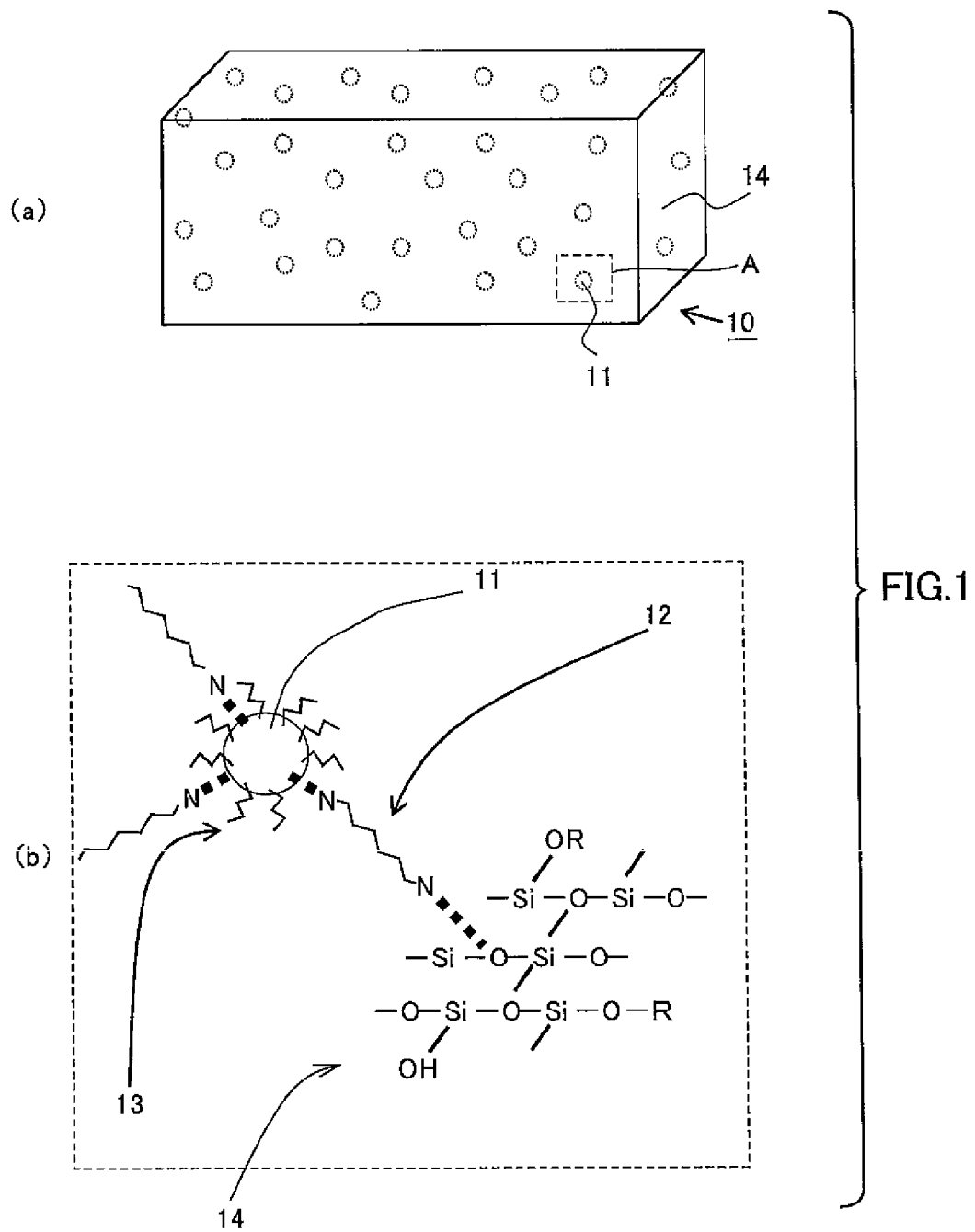
FIG. 1(a) is a schematic perspective view of a group 13 nitride phosphor according to the present invention.
FIG. 1(b) is a schematic diagram showing a part A in FIG. 1(a) in an enlarged manner.

Referring to the accompanying drawings, it is assumed that identical reference numerals denote identical or corresponding portions. Further, the dimensional relation between the lengths, the magnitudes, the widths etc. is properly varied in order to clarify and simplify the illustration, and does not correspond to the actual dimensions.

<Group 13 Nitride Phosphor>

FIG. 1(a) is a schematic perspective view of a group 13 nitride phosphor 10 according to the present invention, and FIG. 1(b) is a schematic diagram showing a part A in FIG. 1(a) in an enlarged manner. The structure of group 13 nitride phosphor 10 according to the present invention is now described with reference to FIGS. 1(a) and 1(b).

As shown in FIG. 1(a), group 13 nitride phosphor 10 includes group 13 nitride crystallites 11 and a matrix 14 of a silica gel solid layer in which group 13 nitride crystallites 11 are dispersed. Group 13 nitride crystallites 11 hardly flocculate with each other, and are uniformly dispersed in matrix 14 of the silica gel solid layer. As shown in FIG. 1(b), a diamine compound 12 is bonded to the surface of each group 13 nitride crystallite 11, to cover group 13 nitride crystallite 11. Preferably, modified organic molecules 13 are further bonded to the surface of each group 13 nitride crystallite 11, so that group 13 nitride crystallite 11 is also covered with modified organic molecules 13. Diamine compound 12 is also bonded to matrix 14 of the silica gel solid layer. In other words, one of nitrogen elements in two amino groups of diamine compound 11 is bonded to group 13 nitride crystallite 11, and the other nitrogen element is bonded to matrix 14 of the silica gel solid layer.

Both of coordinate bonds by the nitrogen elements and a bond resulting from physical adsorption conceivably contribute to these bonds. These bonds can be confirmed by a nuclear magnetic resonance apparatus (by Chemagnetics), for example.

Further, defects resulting from dangling bonds of the group 13 element on the surface of crystallite 11 can conceivably be capped due to the nitrogen elements, contained in diamine compound 12 and molecular organic molecules 13, coordinate-bonded to the group 13 element of group 13 nitride crystallite 11.

Modified organic molecules 13 so cover group 13 nitride crystallites 11 that group 13 nitride crystallites 11 do not flocculate but group 13 nitride phosphor 10 is improved in luminous intensity. Diamine compound 12 and modified organic molecules 13 conceivably cause electric polarity between nitrogen atoms and carbon atoms, to strongly adhere to the surfaces of crystallites 11.

In group 13 nitride phosphor 10, the volume ratio of group 13 nitride crystallites 11 to matrix 14 of the silica gel solid layer is preferably in the range of 0.001 to 0.1. If the volume ratio is in the range of 0.001 to 0.1, group 13 nitride crystallites 11 hardly flocculate, and are homogeneously dispersible.

Diamine compound 12 is preferably a compound having two amino groups in each molecule, i.e., a compound having amino groups on both ends of a hydrocarbon chain. This hydrocarbon chain may be either an aliphatic carbon chain or an aromatic benzene chain. Further, the aliphatic carbon chain may be either a saturated aliphatic carbon chain or an unsaturated aliphatic carbon chain. In addition, the hydrocarbon chain may be a straight carbon chain or a branched chain. More specifically, diamine compound 12 is preferably a compound expressed in a general formula $NH_2(CH_2)_nNH_2$ (n: integer of at least 1), preferably $3 \leq n \leq 10$, more preferably $4 \leq n \leq 8$. Tetramethylene diamine, pentamethylene diamine, hexamethylene diamine, heptamethylene diamine, octamethylene diamine or the like can be listed as a specific example of diamine compound 12.

In the present invention, the material for modified organic molecules 13 is defined as a compound having hydrophilic groups and hydrophobic groups in the same molecules. Further, the material for modified organic molecules 13 is preferably amine, which is a compound having nonpolar hydrocarbon chains as hydrophobic groups and amino groups as hydrophilic groups. Butylamine, t-butylamine, isobutylamine, tri-n-butylamine, triisobutylamine, triethylamine, diethylamine, hexylamine, dimethylamine, laurylamine, octylamine, tetradecylamine, trioctylamine or the like can be listed as a specific example of the material for modified organic molecules 13.

In the present invention, matrix 14 of the silica gel solid layer is a covalent crystal having such a structure that regular tetrahedral structures having silicon atoms at the centers innumerably range through oxygen atoms, in which arbitrary Si or O is substituted by a substituent such as $CH_3$, for example.

<Group 13 Nitride Crystallite>

According to the present invention, group 13 nitride crystallites 11 are formed by particulates of a semiconductor, i.e., particulates of a compound having at least one of the group 13 elements (B, Al, Ga, In and Tl) and having bonds of the group 13 element and nitrogen elements. The material for group 13 nitride crystallites 11, employable as phosphor particulates, is a substance excited by light having a peak wavelength shorter than the peak emission wavelength to emit light having a peak wavelength of 190 to 1800 nm. More specifically, the material for group 13 nitride crystallites 11 is preferably prepared from gallium nitride (GaN), indium nitride (InN), aluminum nitride (AlN), indium gallium nitride (InGaN), indium aluminum nitride (InAlN), gallium aluminum nitride (GaAlN) or indium aluminum gallium nitride (InAlGaN), in view of the band gap.

Each group 13 nitride crystallite 11 may contain unintentional impurities, and at least any one of the group 2 elements (Be, Mg, Ca, Sr and Ba), Zn and Si may be intentionally added thereto as a dopant in a low concentration. The concentration of the dopant is particularly preferably in the range of $1 \times 10^{16}$ cm$^{-3}$ to $1 \times 10^{21}$ cm$^{-3}$, and Mg, Zn or Si is preferably employed as the dopant.

According to the present invention, each group 13 nitride crystallite 11 may have a single particle structure consisting of only a single material or a semiconductor core/semiconductor shell structure covered with at least one semiconductor shell of a different material.

If each group 13 nitride crystallite 11 has a semiconductor core/semiconductor shell structure, the semiconductor core is preferably made of a semiconductor, such as InN, for example, having a small band gap. The band gap of the semiconductor shell is preferably larger than that of the semiconductor core. The semiconductor shell may be formed by a plurality of layers. The semiconductor shell may not entirely cover the inner shell of the semiconductor core, and the thickness thereof may be distributed.

When each group 13 nitride crystallite 11 according to the present invention has a semiconductor core/semiconductor shell structure, the particle diameter of the semiconductor core and the thickness of the semiconductor shell can be confirmed by confirming a lattice fringe image at a high magnification through TEM observation.

The average particle diameter of the semiconductor core according to the present invention is generally estimated as 5 to 6 nm from the spectral line half-width as a result of X-ray diffraction measurement, and this particle diameter is not more than twice the Bohr radius of an exciton. The thickness of the semiconductor shell is adjusted to the range of 1 to 10 nm. If the thickness of the semiconductor shell is smaller than 1 nm, the surface of the semiconductor core cannot be sufficiently coated and a semiconductor shell having a uniform thickness is hard to form. If the thickness of the semiconductor shell is larger than 10 nm, on the other hand, the effect of quantum confinement is weakened, it is difficult to homogeneously form the semiconductor shell, the number of defects is increased, and the cost for the raw material leads to an unpreferable result.

When group 13 nitride crystallite 11 having a semiconductor core/semiconductor shell structure absorbs excitation light in the present invention, the energy of the excitation light is absorbed by the outer semiconductor shell, and thereafter makes a transition to the semiconductor core. The semiconductor core has a small particle diameter exhibiting the quantum size effect, whereby the semiconductor core can assume only a plurality of discrete energy levels, while a single level may also be available. The light energy making a transition to the semiconductor core makes a transition between ground levels of the conduction band and the valence band, leading to emission of light having a wavelength corresponding to the energy.

The band gap of group 13 nitride crystallite 11 (the semiconductor core when group 13 nitride crystallite 11 has a semiconductor core/semiconductor shell structure) is preferably in the range of 1.8 to 2.8 eV. This band gap is particularly preferably in the range of 1.85 to 2.5 eV when group 13 nitride phosphor 10 emits red light, in the range of 2.3 to 2.5 eV when group 13 nitride phosphor 10 emits green light, and in the range of 2.65 to 2.8 eV when group 13 nitride phosphor 10 emits blue light. The color of the light emitted by group 13 nitride phosphor 10 is decided by adjusting the mixed crystal ratio of the group 13 element(s).

The particle diameter of group 13 nitride crystallite 11 is preferably in the range of 0.1 to 100 nm, particularly preferably in the range of 0.5 to 50 nm, and further preferably in the range of 1 to 20 nm.

When the particle diameter is not more than twice the Bohr radius of the exciton, the luminous intensity is remarkably improved. The term "Bohr radius" denotes the spread of existence probability of the exciton, which is expressed in the following formula (1). For example, the Bohr radii of GaN and InN are about 3 nm and about 7 nm respectively.

$$y = 4\pi \in h^2 \cdot me^2 \qquad \text{formula(1)}$$

where y represents Bohr radius, ∈ represents dielectric constant, h represents Planck's constant, m represents effective mass and e represents elementary charge.

While the optical band gap further spreads due to the quantum size effect when the particle diameter is not more than twice the Bohr radius of the exciton, the band gap is preferably in the aforementioned range also in this case.

<Method of Preparing Group 13 Nitride Phosphor>

Figure 2:
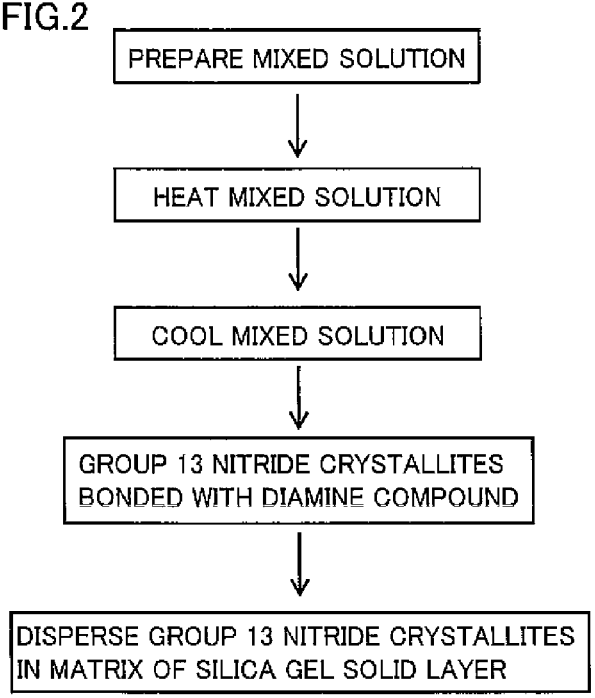
FIG. 2 is a flow chart showing the steps of manufacturing a group 13 nitride phosphor according to the present invention.

FIG. 2 shows a flow chart of the steps of a method of preparing a group 13 nitride phosphor according to the present invention. The method of preparing a group 13 nitride phosphor according to the present invention is now described with reference to the steps shown in FIG. 2.

In the method of preparing a group 13 nitride phosphor according to the present invention, a diamine compound bonded to the surfaces of group 13 nitride crystallites and the material therefor are identical to each other as chemical substances. In the present invention, further, modified organic molecules and the material therefor are identical to each other as chemical substances.

<<Preparation of Mixed Solution>>

A mixed solution is prepared by mixing at least a diamine compound, a group 13 element-containing compound and a nitrogen element-containing compound with each other or by mixing at least a diamine compound and a group 13 element-nitrogen element-containing compound with each other.

The term "group 13 element-containing compound" denotes a compound containing at least a group 13 element, and the term "nitrogen element-containing compound" denotes a compound containing at least a nitrogen element. The term "group 13 element-nitrogen element-containing compound" denotes a compound having at least a group 13 element and a nitrogen element in each molecule.

The group 13 element-containing compound, the nitrogen element-containing compound and the group 13 element-nitrogen element-containing compound can be employed as "precursors" for the group 13 nitride crystallites.

The aforementioned group 13 element-nitrogen element-containing compound such as hexa(dimethylamino)indiumgallium ([((CH$_3$)$_2$N)$_2$In-(μ-N(CH$_3$)$_2$)$_2$—Ga(N(CH$_3$)$_2$)$_2$](μ-N(CH$_3$)$_2$ represent ligands linking In and Ga with each other in molecules) or a tris(dimethylamino) gallium dimer ([Ga(N(CH$_3$)$_2$)$_3$]$_2$), for example, can be employed as the precursor for the group 13 nitride crystallites.

The mixed solution in the present invention is prepared by dissolving and mixing 0.1 to 10 mass % of this precursor into a solution of a hydrocarbon solvent containing 1 to 25 mass % of diamine compound and 1 to 50 mass % of modified organic molecules at an arbitrary ratio. In this specification, a compound solution consisting of carbon atoms and hydrogen atoms is referred to as a hydrocarbon solvent.

The size of the group 13 nitride crystallites can be increased by reducing the content of the modified organic molecules in the mixed solution thereby reducing surface modifying power, while the size of the group 13 nitride crystallites can be reduced by increasing the content of the modified organic molecules in the mixed solution. This is conceivably because the modified organic molecules also serve as a surface-active agent. In other words, it is conceivable that the modified organic molecules are easily condensed as the concentration in the hydrocarbon solvent is increased, to reduce the size of the crystallites in the process of preparation.

<<Heating Mixed Solution>>

The mixed solution is stirred and heated in an inert gas atmosphere at a synthesis temperature of 180 to 500° C., more preferably 280 to 400° C., for 6 to 72 hours, more preferably 12 to 48 hours. Thus, a chemical reaction is caused to simultaneously progress formation of group 13 nitride crystallites and formation of group 13 nitride crystallites covered with the diamine compound and the modified organic molecules.

<<Cooling Mixed Solution>>

Then, the heated mixed solution is arbitrarily cooled and mixed with methanol for preparing a methanol solution, and the group 13 nitride crystallites covered with the diamine compound and the modified organic molecules are extracted in this methanol solution.

When the group 13 nitride crystallites have a semiconductor core/semiconductor shell structure, a second mixed solution is prepared by dissolving 0.1 to 10 mass % of the aforementioned "precursor" for the group 13 nitride crystallites into a solution of a hydrocarbon solvent containing 1 to 25 mass % of diamine compound and 1 to 50 mass % of modified organic molecules at an arbitrary ratio with respect to the aforementioned mixed solution after the chemical reaction. The thickness of semiconductor shells can be controlled by adjusting the arbitrary ratio and adjusting the molecular weight of the modified organic molecules.

A chemical reaction is caused on the second mixed solution. This chemical reaction is caused in an inert gas atmosphere, and completed by stirring and heating the second mixed solution at a temperature of 180 to 500° C., more preferably 280 to 400° C. for 6 to 72 hours, more preferably 12 to 48 hours. Semiconductor shells are formed by this chemical reaction.

Then, the heated second mixed solution is arbitrarily cooled and mixed with methanol for preparing a methanol solution, and the group 13 nitride crystallites of the semiconductor core/semiconductor shell structure covered with the diamine compound and the modified organic molecules are extracted in the methanol solution.

The surfaces of the semiconductor shells are covered with the modified organic molecules and the diamine compound.

<<Dispersion in Matrix of Silica Gel Solid Layer>>

The step of dispersing the group 13 nitride crystallites synthesized in the aforementioned manner in a matrix of a silica gel solid layer is now described.

A well-known method can be applied to preparation of the matrix of the silica gel solid layer. For example, the matrix of the silica gel solid layer can be formed by preparing a silica gel precursor consisting of alkoxysilane and dimethylformamide, dropping a small amount of catalyst such as alcohol, water, hydrochloric acid, nitric acid or ammonia on this silica gel precursor and performing hydrolysis and condensation polymerization in the range of the room temperature to 150° C.

The group 13 nitride crystallites can be fixated in a state homogeneously dispersed in the matrix of the silica gel solid layer by preparing the silica gel precursor, dropping the catalyst on the silica gel precursor, adding the aforementioned methanol solution having the group 13 nitride crystallites dispersed therein and performing hydrolysis and condensation polymerization. This is because the diamine compound strongly bonds the group 13 nitride crystallites and the matrix of the silica gel solid layer to each other. Thus, a group 13 nitride phosphor can be obtained.

The thicknesses of the diamine compound and the modified organic molecules in the present invention can be confirmed at a high magnification through TEM observation.

While Examples of the present invention are now described in detail, the present invention is not restricted to these Examples.

EXAMPLES

In relation to Examples, it is assumed that provisional notation "A/B" denotes that A is coated with B.

Example 1

<Step of Preparing Mixed Solution>

First, a tris(dimethylamino) indium dimer was prepared. 0.03 moles of lithium dimethylamide and 0.01 moles of indium trichloride were added to a hydrocarbon solvent of n-hexane, and a chemical reaction was caused while stirring the mixture at 20° C. for 50 hours. After completion of this chemical reaction, lithium chloride formed as a byproduct was removed, and the tris(dimethylamino) indium dimer was taken out. The following chemical formula (1) expresses this chemical reaction:

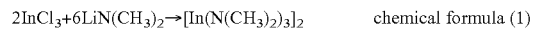

$$2InCl_3 + 6LiN(CH_3)_2 \rightarrow [In(N(CH_3)_2)_3]_2 \quad \text{chemical formula (1)}$$

A tris(dimethylamino) gallium dimer was prepared by a similar method. The following chemical formula (2) expresses this chemical reaction:

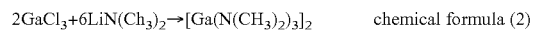

$$2GaCl_3 + 6LiN(Ch_3)_2 \rightarrow [Ga(N(CH_3)_2)_3]_2 \quad \text{chemical formula (2)}$$

Then, 0.005 moles of tris(dimethylamino) indium dimer and 0.005 moles of tris(dimethylamino) gallium dimer, both prepared in the aforementioned manner, were added to n-hexane employed as a hydrocarbon solvent, and a chemical reaction was caused while stirring this mixture at 20° C. for 50 hours. After completion of the chemical reaction, hexa(dimethylamino) indium-gallium was taken out. The following chemical formula (3) expresses this chemical reaction:

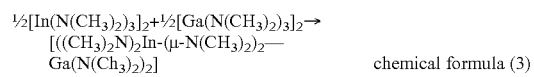

$$½[In(N(CH_3)_2)_3]_2 + ½[Ga(N(CH_3)_2)_3]_2 \rightarrow$$
$$[((CH_3)_2N)_2In\text{-}(\mu\text{-}N(CH_3)_2)_2\text{---}$$
$$Ga(N(Ch_3)_2)_2] \quad \text{chemical formula (3)}$$

In the chemical formula (3), the notation "$\mu\text{-}N(CH_3)_2$" denotes a ligand linking In and Ga with each other in each molecule.

Then, a mixed solution was prepared by mixing 0.002 moles of hexa(dimethylamino)indium-gallium, 0.003 moles of tris(dimethylamino) gallium dimer, 0.6 g of hexamethylenediamine employed as a diamine compound and 30 g of trioctylamine employed as modified organic molecules into 200 ml of benzene employed as a hydrocarbon solvent.

Lithium dimethylamide and the by-produced tris(dimethylamino) gallium dimer and tris(dimethylamino) indium dimer and hexa(dimethylamino) indium-gallium have high reactivity. Therefore, all of the aforementioned chemical reactions were caused in an inert gas atmosphere.

<Step of Preparing Group 13 Nitride Crystallites>
<<Heating Mixed Solution>>

The aforementioned mixed solution was heated in a nitrogen gas atmosphere at a synthesis temperature of 280° C. for a synthesis time of 12 hours, for causing a chemical reaction. In this heating step, the mixed solution was continuously stirred with a stirrer.

As a result of this heating, formation of group 13 nitride crystallites covered with the diamine compound and the modified organic molecules and formation of the group 13 nitride crystallites themselves simultaneously progressed, to form group 13 nitride crystallites having surfaces to which the diamine compound expressed as $In_{0.2}Ga_{0.8}N/nH_2N(CH_2)_6NH_2$, $nN(C_8H_{17})_3$ and the modified organic molecules were bonded. The following chemical formula (4) expresses this chemical reaction:

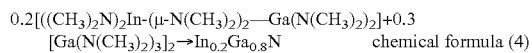

chemical formula (4)

<<Cooling Mixed Solution>>

The heated mixed solution was air-cooled to about the room temperature, a methanol solution was prepared by mixing 200 ml of methanol into the mixed solution, and the group 13 nitride crystallites boned with the diamine compound and the modified organic molecules were extracted in this methanol solution.

<Step of Dispersing Group 13 Nitride Crystallites in Matrix of Silica Gel Solid Layer>

First, a silica gel precursor was prepared by mixing 0.5 moles of tetramethoxysilane and 0.5 moles of dimethylformamide with each other. Further, 5 moles of water, 1.1 moles of methanol and 0.0002 moles of ammonia were dropped on the silica gel precursor and reacted at the room temperature for one hour. 1 ml of the aforementioned methanol solution having the group 13 nitride crystallites dispersed therein was mixed into this silica gel precursor, thereby forming $In_{0.2}Ga_{0.8}N/nH_2N(CH_2)_6NH_2$, $nN(C_8H_{17})_3/$—SiO—SiOCH$_n$— (group 13 nitride phosphor prepared by dispersing the group 13 nitride crystallites covered with the diamine compound and the modified organic molecules in the matrix of the silica gel solid layer; n: arbitrary integer).

In the group 13 nitride phosphor obtained in Example 1, the group 13 nitride crystallites indium gallium nitride covered with the diamine compound and the modified organic molecules were fixated in the matrix of the silica gel solid layer. For this group 13 nitride phosphor, a blue light-emitting diode consisting of a group 13 nitride was employable as an excitation source. The group 13 nitride phosphor according to Example 1 was capable of efficiently absorbing light of 405 nm having high external quantum efficiency emitted from the excitation source in particular. Further, the In composition ratio of the group 13 nitride crystallites consisting of $In_{0.2}Ga_{0.8}N$ crystals according to Example 1 was so adjusted that the peak emission wavelength of fluorescence was 460 nm, whereby the group 13 nitride phosphor was capable of absorbing the excitation light of 405 nm and exhibiting blue fluorescence.

Example 2

A group 13 nitride phosphor absorbing excitation light and emitting blue light was obtained by a method similar to that in Example 1, except that 1.2 g of hexamethylenediamine was employed as a diamine compound. The obtained group 13 nitride phosphor was capable of efficiently absorbing excitation light of 405 nm having high external quantum efficiency in particular. The peak emission wavelength of fluorescence emitted by group 13 nitride crystallites upon absorption of the excitation light was 460 nm.

In the method according to Example 2, the concentration of the diamine compound was further increased as compared with Example 1, whereby bonding between the group 13 nitride crystallites and silica gel was strengthened, the group 13 nitride crystallites were homogeneously dispersible in a matrix of a silica gel solid layer, and peak luminous intensity of the group 13 nitride phosphor was conceivably improved as a result.

Example 3

A first mixed solution was prepared by mixing 0.001 moles of hexa(dimethylamino) indium-gallium, 0.0015 moles of tris(dimethylamino) gallium dimer, 0.6 g of hexamethylenediamine employed as a diamine compound and 15 g of triocytylamine employed as modified organic molecules into 100 ml of benzene employed as a hydrocarbon solvent. The first mixed solution was sufficiently stirred and thereafter heated in a nitrogen gas atmosphere at a synthesis temperature of 280° C. for a synthesis time of 12 hours, for causing a chemical reaction. In this heating step, the first mixed solution was continuously stirred with a stirrer.

The heated first mixed solution was cooled to the room temperature, and a second mixed solution was prepared by mixing 0.005 moles of tris(dimethylamino) gallium dimer, 0.6 g of hexamethylenediamine employed as a diamine compound and 15 g of triocytylamine employed as modified organic molecules into 100 ml of benzene employed as a hydrocarbon solvent.

The second mixed solution was sufficiently stirred, and thereafter reacted. The following chemical formula (5) expresses this reaction. The second mixed solution was heated in a nitrogen gas atmosphere at a synthesis temperature of 280° C. for a synthesis time of 12 hours, to cause this chemical reaction. In this heating step, the second mixed solution was continuously stirred with a stirrer.

chemical formula (5)

According to this reaction, semiconductor shells grew from the added tris(dimethylamino) gallium dimer on semiconductor cores of crystals formed by heating the first mixed solution, to form group 13 nitride crystallites having a semiconductor core/semiconductor shell structure.

Then, the heated second mixed solution and 200 ml of methanol were mixed with each other, and the group 13 nitride crystallites of the semiconductor core/semiconductor shell structure bonded with the diamine compound and the modified organic molecules were extracted in the methanol solution.

Then, a silica gel precursor was prepared by mixing 0.5 moles of tetramethoxysilane and 0.5 moles of dimethylformamide with each other. Then, 5 moles of water, 1.1 moles of methanol and 0.0002 moles of ammonia were dropped on the silica gel precursor and reacted at the room temperature for one hour. 1 ml of the aforementioned methanol having the group 13 nitride crystallites dispersed therein was mixed into the silica gel precursor, thereby forming $In_{0.2}Ga_{0.8}N/GaN/nH_2N(CH_2)_6NH_2$, $nN(C_8H_{17})_3/$—SiO—SiOCH— (group 13 nitride phosphor prepared by dispersing the group 13 nitride crystallites covered with the diamine compound and the modified organic molecules in the matrix of the silica gel solid layer; n: arbitrary integer).

In the group 13 nitride phosphor obtained in Example 3, the group 13 nitride crystallites of the semiconductor core/semiconductor shell structure covered with the diamine compound and the modified organic molecules were dispersed in the matrix of the silica gel solid layer. For this group 13 nitride phosphor, a blue light-emitting diode consisting of a group 13 nitride was employed as an excitation source. The group 13 nitride phosphor according to Example 3 efficiently absorbed light of 405 nm having high external quantum efficiency emitted from the excitation source in particular. Further, the In composition ratio of the group 13 nitride crystallites consisting of $In_{0.2}Ga_{0.8}N$ crystals according to Example 3 was so adjusted that the peak emission wavelength was 460 nm, whereby the group 13 nitride phosphor was capable of absorbing the excitation light of 405 nm and exhibiting blue fluorescence.

Comparative Example 1

A mixed solution was prepared by mixing 0.08 moles of gallium trichloride ($GaCl_3$) and 0.02 moles of indium trichloride ($InCl_3$) into 200 ml of benzene. This mixed solution was heated at a synthesis temperature of 280° C. for a synthesis time of 3 hours for causing a chemical reaction, thereby synthesizing semiconductor crystals of $In_{0.2}Ga_{0.8}N$. The heated mixed solution was cooled to the room temperature.

Then, a silica gel precursor was prepared by mixing 0.5 moles of tetramethoxysilane and 0.5 moles of dimethylformamide with each other. Further, 5 moles of water, 1.1 moles of methanol and 0.0002 moles of ammonia were dropped on the silica gel precursor and reacted at the room temperature for one hour. 1 ml of a benzene solution (mixed solution) in which the semiconductor crystals of $In_{0.2}Ga_{0.8}N$ were dispersed was mixed into this silica gel precursor, thereby forming $In_{0.2}Ga_{0.8}N/SiO_2$ (phosphor obtained by dispersing the semiconductor crystals in a silica gel matrix).

The phosphor obtained according to comparative example 1, containing no diamine compound bonded to the surfaces of the semiconductor crystals of $In_{0.2}Ga_{0.8}N$, was not strongly bondable to the silica gel matrix and not homogeneously dispersible. Therefore, it was impossible to obtain a transparent phosphor with no emission scattering, and it was difficult to implement desired luminous efficiency with an excitation source of a blue light-emitting diode consisting of a group 13 nitride. Further, neither diamine compound nor modified organic molecules were bonded to the surfaces of the semiconductor crystals of $In_{0.2}Ga_{0.8}N$, whereby the semiconductor crystals were inferior in dispersibility and flocculated in the silica gel matrix.

Figure 3:
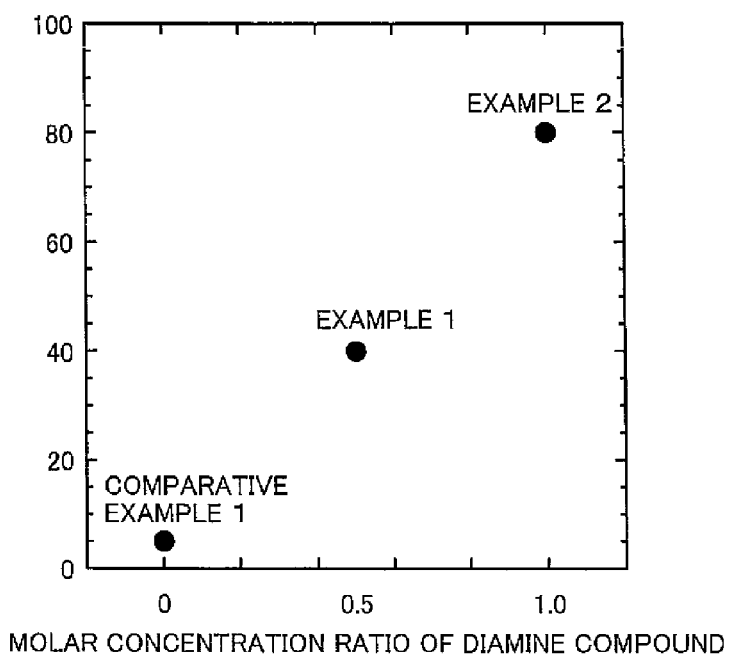
FIG. 3 is a diagram showing the correlation between luminous intensity and diamine compound molar concentration for illustrating emission characteristics of group 13 nitride phosphors according to Examples 1 and 2 and a phosphor according to comparative example 1.

FIG. 3 is a diagram showing the correlation between luminous intensity and diamine compound molar concentration for illustrating the emission characteristics of the group 13 nitride phosphors according to Examples 1 and 2 and the phosphor according to comparative example 1. Referring to FIG. 3, the axis of abscissas shows the molar concentration ratios of the diamine compounds to the group 13 nitride crystallites in the mixed solutions (Examples 1 and 2) and the molar concentration ratio of a diamine compound to the semiconductor crystals in the mixed solution (comparative example 1). Referring to FIG. 3, further, the axis of ordinates shows luminous intensity levels (arbitrary unit (a.u.)) of fluorescence (wavelength: 460 nm) emitted from the group 13 nitride phosphors according to Examples 1 and 2 and the phosphor according to comparative example 1 when absorbing the excitation light having the wavelength of 405 nm. The luminous intensity levels as well as the wavelengths of the excitation light and the fluorescence were measured with a fluorescence spectrophotometer (by Horiba, Ltd.).

As understood from FIG. 3, the group 13 nitride phosphors according to Examples 1 and 2 exhibited luminous efficiency levels higher than that of the phosphor according to comparative example 1.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A group 13 nitride phosphor consisting of group 13 nitride crystallites having a group 13 element dispersed in a matrix of a silica gel solid layer,
   wherein a diamine compound is bonded to the surfaces of said group 13 nitride crystallites and said silica gel solid layer and
   modified organic molecules are further bonded to the surfaces of said group 13 nitride crystallites.

2. The group 13 nitride phosphor according to claim 1, wherein the material for said modified organic molecules is amine.

3. The group 13 nitride phosphor according to claim 1, wherein said group 13 element is In and/or Ga.

4. A method of preparing a group 13 nitride phosphor consisting of group 13 nitride crystallites having a group 13 element dispersed in a matrix of a silica gel solid layer, comprising the steps of:
   preparing a mixed solution by mixing a diamine compound, modified organic molecules, a group 13 element-containing compound and a nitrogen element-containing compound with each other or by mixing a diamine compound, modified organic molecules, and a group 13 element-nitrogen element-containing compound with each other;
   preparing group 13 nitride crystallites bonded with said diamine compound and said modified organic molecules by heating said mixed solution; and
   dispersing said group 13 nitride crystallites in a matrix of a silica gel solid layer.

5. The method of preparing a group 13 nitride phosphor according to claim 4, wherein the material for said modified organic molecules is amine.

6. A group 13 nitride phosphor comprising group 13 nitride crystallites having a group 13 element dispersed in a matrix of a silica gel solid layer,
   wherein a diamine compound is bonded to the surfaces of said group 13 nitride crystallites and said silica gel solid layer and
   modified organic molecules are further bonded to the surfaces of said group 13 nitride crystallites.

7. A method of preparing a group 13 nitride phosphor comprising group 13 nitride crystallites having a group 13 element dispersed in a matrix of a silica gel solid layer, comprising the steps of:
   preparing a mixed solution by mixing a diamine compound, modified organic molecules, a group 13 element-containing compound and a nitrogen element-containing compound with each other or by mixing a diamine compound, modified organic molecules, and a group 13 element-nitrogen element-containing compound with each other;
   preparing group 13 nitride crystallites bonded with said diamine compound and said modified organic molecules by heating said mixed solution; and
   dispersing said group 13 nitride crystallites in a matrix of a silica gel solid layer.

* * * * *